(12) United States Patent
Nakazato et al.

(10) Patent No.: US 9,825,264 B2
(45) Date of Patent: Nov. 21, 2017

(54) ELECTRICITY STORAGE DEVICE, ELECTRICITY STORAGE DEVICE CONTAINER, AND ELECTRICITY STORAGE DEVICE PACKAGING MATERIAL

(71) Applicants: TOYO INK SC HOLDINGS CO., LTD., Tokyo (JP); TOYO-MORTON, LTD., Tokyo (JP); TOYOCHEM CO., LTD., Tokyo (JP)

(72) Inventors: Atsushi Nakazato, Tokyo (JP); Masayuki Horiguchi, Tokyo (JP); Satoko Niwa, Tokyo (JP)

(73) Assignees: Toyo Ink SC Holding Co., Ltd., Tokyo (JP); Toyo-Morton, Ltd., Tokyo (JP); Toyochem Co., Ltd., Tokyo (JP)

( * ) Notice: Subject to any disclaimer, the term of this patent is extended or adjusted under 35 U.S.C. 154(b) by 203 days.

(21) Appl. No.: 14/813,400

(22) Filed: Jul. 30, 2015

(65) Prior Publication Data
US 2016/0036013 A1    Feb. 4, 2016

(30) Foreign Application Priority Data

Aug. 1, 2014 (JP) .................................. 2014-157500
Oct. 24, 2014 (JP) .................................. 2014-216804

(51) Int. Cl.
*H01M 10/05*      (2010.01)
*H01M 2/02*      (2006.01)
(Continued)

(52) U.S. Cl.
CPC ............. *H01M 2/0287* (2013.01); *B32B 7/12* (2013.01); *B32B 15/08* (2013.01); *B32B 15/20* (2013.01);
(Continued)

(58) Field of Classification Search
CPC ............ H01M 2/0287; H01M 10/0525; B32B 2457/16; B32B 7/12; B32B 15/08; B32B 27/30
See application file for complete search history.

(56) References Cited

U.S. PATENT DOCUMENTS

2011/0143004 A1*   6/2011   Wood ....................... A01N 3/00
                                                             426/324

FOREIGN PATENT DOCUMENTS

CN            1267478          8/2006
JP             8-193148         7/1996
(Continued)

OTHER PUBLICATIONS

Japanese Office Action issued in Japanese Application No. 2014-216804 dated Dec. 16, 2014.
(Continued)

*Primary Examiner* — Mark F Huff
*Assistant Examiner* — Monique Wills
(74) *Attorney, Agent, or Firm* — Seyfarth Shaw LLP

(57) ABSTRACT

A an electricity storage device according to the present invention including an electricity storage device packaging material, in the electricity storage device packaging material, from an outer layer thereof, at least an outer layer side resin film layer, an outer layer side adhesive layer, a metal foil layer, an inner layer side adhesive layer, and a heat seal layer being stacked, in which the inner layer side adhesive layer is a layer for bonding the metal foil layer with the heat seal layer, and is a layer obtained by performing a curing process for an adhesive compound including: a polyolefin resin (A) including a carboxyl group or an acid anhydride group; and an epoxy compound (B) including at least two
(Continued)

epoxy groups and including at least one of an aromatic amino group and a heterocycle including a nitrogen atom as a heteroatom.

13 Claims, 3 Drawing Sheets

(51) Int. Cl.
| | |
|---|---|
| *B32B 7/12* | (2006.01) |
| *B32B 15/08* | (2006.01) |
| *B32B 15/20* | (2006.01) |
| *B32B 27/32* | (2006.01) |
| *B32B 27/34* | (2006.01) |
| *B32B 27/36* | (2006.01) |
| *H01M 10/0525* | (2010.01) |

(52) U.S. Cl.
CPC .............. *B32B 27/32* (2013.01); *B32B 27/34* (2013.01); *B32B 27/36* (2013.01); *H01M 2/026* (2013.01); *B32B 2255/06* (2013.01); *B32B 2255/26* (2013.01); *B32B 2307/31* (2013.01); *B32B 2307/50* (2013.01); *B32B 2307/714* (2013.01); *B32B 2439/00* (2013.01); *B32B 2457/10* (2013.01); *B32B 2457/16* (2013.01); *H01M 10/0525* (2013.01)

(56) References Cited

FOREIGN PATENT DOCUMENTS

| | | |
|---|---|---|
| JP | 2006-307104 | 11/2006 |
| JP | 2009-193682 | 8/2009 |
| JP | 2012-216364 | 11/2012 |
| JP | 2013-091702 | 5/2013 |
| WO | WO 03/048235 | 6/2003 |
| WO | WO 2014/050686 | 3/2014 |

OTHER PUBLICATIONS

Korean Office Action issued in Korean Patent Application No. 10-2015-0106485 dated Dec. 10, 2015.

Office Action issued in Taiwan Patent Application No. 104124683 dated Jan. 29, 2016.

\* cited by examiner

ELECTRICITY STORAGE DEVICE, ELECTRICITY STORAGE DEVICE CONTAINER, AND ELECTRICITY STORAGE DEVICE PACKAGING MATERIAL

INCORPORATION BY REFERENCE

This application is based upon and claims the benefit of priority from Japanese patent applications No. 2014-157500, filed on Aug. 1, 2014 and 2014-216804, filed on Oct. 24, 2014, the disclosure of which is incorporated herein in its entirety by reference.

BACKGROUND OF THE INVENTION

1. Field of the Invention

The present invention relates to an electricity storage device. Further, the present invention relates to an electricity storage device container and electricity storage device packaging material.

2. Description of Related Art

Secondary batteries are typical electricity storage devices. Because of the rapid growth of electronic device fields such as mobile phones and portable computers, the demand for secondary batteries such as light and small lithium-ion batteries has increased. As packages for secondary batteries, metal cans have been used in the past. However, packaging materials formed by laminating plastic films and metal foils and so on have been entering the mainstream in view of their lightness and productivity.

Examples of the simplest packaging materials include a laminate having, from the outer layer side thereof, an outer layer side resin film layer 11, an outer layer side adhesive layer 12, a metal foil layer 13, an inner layer side adhesive layer 14, and a heat seal layer 15 as shown in FIG. 1. As shown in FIG. 2, a battery container is molded from the above-described packaging material (i.e., performing deep-draw molding, stretch-expand forming, or the like) in such a manner that the outer layer side resin film layer 11 forms a convex surface and the heat seal layer 15 forms a concave surface. Then, a battery is manufactured by encapsulating electrodes, an electrolyte solution, and the like on the concave surface side of the battery container and accommodating the battery container.

Further, a capacitor is also a type of electricity storage device. In particular, the lithium-ion capacitor field is one whose market is expected to grow in the future.

Patent Literature 1 (Japanese Unexamined Patent Application Publication No. H08-193148) discloses an adhesive resin composition containing, in a specific ratio, (A) a polyolefin-based resin including at least one type of a functional group selected from a group consisting of an acid anhydride group, a carboxyl group, and a metal carboxylate, and (B) an epoxy compound including at least two epoxy groups and having a molecular weight of 3,000 or lower.

Patent Literature 2 (Japanese Unexamined Patent Application Publication No. 2012-216364) discloses a package for a battery including an adhesive layer containing, in a specific ratio, an acid-modified polypropylene resin containing 70 mass % or more of a propylene component and 0.1 to 10 mass % of an acidic component, and a cross-linking agent including at least one of an oxazoline compound and an epoxy compound.

Patent Literature 3 (Japanese Unexamined Patent Application Publication No. 2013-91702) discloses an adhesive resin composition containing an acid-modified polyolefin resin (A), and an epoxy resin compound (B) including at least two epoxy groups in one molecule and at least ten hydroxyl groups in one molecule.

Patent Literature 4 (International Patent Publication No. WO2014/050686) discloses a lamination adhesive composition containing a polyolefin resin (A) including a hydroxyl group and/or an acid group, a phosphoric-acid-modified compound (B), and an epoxy resin (C) having an epoxy equivalent weight of 160 to 1,000 (claim 4). Further, Patent Literature 4 discloses application of the lamination adhesive composition to a laminate for a secondary battery (claim 9).

Patent Literature 5 (Japanese Unexamined Patent Application Publication No. 2006-307104) discloses an adhesive composition including: a main agent containing maleic-acid-modified chlorinated polypropylene, phosphate, ultra-fine particles silane, and an organic solvent; and a curing agent containing a silane coupling agent, and an epoxy resin and/or polyisocyanate. It is mentioned that the addition of ultra-fine particles silane prevents precipitation of phosphate, thus making it possible to improve the application property of the adhesive composition.

SUMMARY OF THE INVENTION

In general, an adhesive layer for bonding a metal foil layer with a heat seal layer in an electricity storage device packaging material is required to have the following properties:

(1) The adhesive strength between the metal foil layer and the heat seal layer is strong; and (2) The adhesive layer has a tolerance to an electrolyte (hereinafter called "electrolyte-resistance"). That is, even after an electrolyte is hermetically encapsulated in the battery container, it should be possible to maintain the adhesive strength between the metal foil layer and the heat seal layer.

For example, an electrolyte solution of a lithium battery includes a lithium salt (electrolyte) such as lithium hexafluorophosphate, and a solvent such as propylene carbonate, ethylene carbonate, diethyl carbonate, and dimethyl carbonate. When an electrolyte solution is put into an electricity storage device container, the electrolyte solution infiltrates through the heat seal layer and reaches the adhesive layer, causing the adhesive strength between the heat seal layer and the metal foil layer to be lowered.

Further, if moisture infiltrates into the electrolyte solution from the outside of the battery container, the lithium salt such as lithium hexafluorophosphate reacts with the water, generating hydrofluoric acid. The generated hydrofluoric acid infiltrates through the heat seal layer and the adhesive layer and reaches the metal foil layer, corroding the metal foil layer. This corrosion significantly lowers the adhesive strength between the heat seal layer and the metal foil layer.

Therefore, the adhesive layer for bonding the heat seal layer with the metal foil layer needs to have a tolerance to substances that will be generated when foreign substances enter from the outside of the electricity storage device and react with the electrolyte as well as tolerance to the electrolyte itself.

Incidentally, in recent years, as the range of use of electricity storage devices has expanded so that they are now being used in vehicles, for the storage of electricity in individual houses, and so on, the electricity storage devices have been required to have a large capacity and long-term durability. Accordingly, it has been desired that electricity storage devices have an excellent electrolyte-resistance, in particular, when they are used in vehicles.

It is mentioned in Patent Literature 1 that an adhesive resin composition layer is formed by melting an adhesive resin composition and extruding it onto a polyester film or a polyamide film, and the adhesive strength between each film and the adhesive resin composition layer can be maintained to some degree even after the laminate is kept in a temperature-controlled bath having a temperature of 60° C. and a relative humidity of 90% for 48 hours. However, Patent Literature 1 neither discloses nor suggests any battery packaging material. The above-described moisture-resistance for the adhesive strength completely differs from the electrolyte-resistance.

As described above, Patent Literature 2 discloses a battery packaging material (i.e. packaging laminate). However, its electrolyte-resistance can be maintained for merely 24 hours at 85° C. or 100° C.

Patent Literature 3 neither discloses nor suggests any battery packaging material. Further, although Patent Literature 3 mentions the initial adhesive strength, it does not mention the durability of the adhesive strength at all. Needless to say, Patent Literature 3 does not mention the electrolyte-resistance at all.

As described above, Patent Literature 4 discloses application of a lamination adhesive composition to a laminate for a secondary battery and mentions "electrolyte-resistance". However, regarding this "electrolyte-resistance", the laminate is merely submerged in a simple solvent (ethylene carbonate or propyl carbonate) including no electrolyte such as a lithium salt at 40° C. for 30 days. That is, the "electrolyte-resistance" in Patent Literature 4 is merely a tolerance to a solvent (hereinafter called "solvent-resistance"). The solvent-resistance completely differs from the tolerance to an electrolyte containing an electrolyte solution.

Patent Literature 5 discloses results in which when the adhesive composition is lacking at least one of the phosphate, the ultra-fine particles silane, and the silane coupling agent, at least one of a solvent external appearance, a normal-state adhesiveness, and a water-resistant adhesiveness becomes defective (see Table 1). Patent Literature 5 also mentions that the adhesive composition is suitable as a material for a weather strip for an automobile. However, Patent Literature 5 neither discloses nor suggests any battery packaging material. Therefore, Patent Literature 5 does not mention electrolyte-resistance at all.

The present invention has been made in view of the above-described background and an object thereof is to provide an adhesive composition that makes it possible to form a laminate capable of maintaining its adhesive strength at a high level even when the laminate is submerged in an electrolyte solution having a higher temperature for a long time. Further, another object of the present invention is to provide an electricity storage device packaging material, an electricity storage device container, and an electricity storage device having a better electrolyte-resistance than that in the past.

Specifically, an object of the present invention is to ensure an electrolyte-resistance at 85° C. for two weeks or longer.

The present invention has solved the above-described problem by using a specific epoxy compound as a curing agent.

A first exemplary aspect of the present invention is an electricity storage device including, at least, an electrolyte, an electrode, and an electricity storage device container, in which: the electricity storage device container includes an electricity storage device packaging material, in the electricity storage device packaging material, from an outer layer, at least an outer layer side resin film layer, an outer layer side adhesive layer, a metal foil layer, an inner layer side adhesive layer, and a heat seal layer being stacked; the heat seal layer is positioned in an inner surface of the electricity storage device container; parts of the heat seal layers of the electricity storage device packaging material are placed on each other and heat-sealed so that the electrolyte is hermetically encapsulated in the electricity storage device container; a terminal for an external connection extends from the electrode accommodated inside the electricity storage device container to the outside of the electricity storage device container, the terminal being sandwiched between the heat seal layers of the electricity storage device container, and in which the inner layer side adhesive layer is a layer for bonding the metal foil layer with the heat seal layer, and is a layer obtained by performing a curing process for an adhesive compound including: a polyolefin resin (A) including a carboxyl group or an acid anhydride group; and an epoxy compound (B) including at least two epoxy groups and including at least one of an aromatic amino group and a heterocycle including a nitrogen atom as a heteroatom.

Further, another exemplary aspect of the present invention is an electricity storage device container accommodating, at least, an electrode and an electrolyte of an electricity storage device, and including an electricity storage device packaging material, in the electricity storage device packaging material, from an outer layer thereof, at least an outer layer side resin film layer, an outer layer side adhesive layer, a metal foil layer, an inner layer side adhesive layer, and a heat seal layer being stacked, in which: the heat seal layer is positioned in an inner surface of the electricity storage device container; and the electricity storage device container is configured so as to be able to form a sealed space by placing parts of the heat seal layers on each other and heat-sealing those parts, and in which the inner layer side adhesive layer is a layer for bonding the metal foil layer with the heat seal layer, and is a layer obtained by performing a curing process for an adhesive compound including: a polyolefin resin (A) including a carboxyl group or an acid anhydride group; and an epoxy compound (B) including at least two epoxy groups and including at least one of an aromatic amino group and a heterocycle including a nitrogen atom as a heteroatom.

Further, another exemplary aspect of the present invention is an electricity storage device packaging material used for an electricity storage device container that accommodates, at least, an electrode and an electrolyte of an electricity storage device, the electricity storage device packaging material including, from an outer layer thereof, at least an outer layer side resin film layer, an outer layer side adhesive layer, a metal foil layer, an inner layer side adhesive layer, and a heat seal layer, in which: the electricity storage device packaging material is configured so as to be able to form a sealed space by placing parts of the heat seal layers on each other and heat-sealing those parts, and in which the inner layer side adhesive layer is a layer for bonding the metal foil layer with the heat seal layer, and is a layer obtained by performing a curing process for an adhesive compound including: a polyolefin resin (A) including a carboxyl group or an acid anhydride group; and an epoxy compound (B) including at least two epoxy groups and including at least one of an aromatic amino group and a heterocycle including a nitrogen atom as a heteroatom.

The use of an adhesive composition according to the present invention makes it possible to form a laminate capable of maintaining its adhesive strength at a high level even when the laminate is submerged in an electrolyte solution at 85° C. for two weeks or longer.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Exemplary embodiments according to the present invention are explained hereinafter in detail. Note that in this specification, the expression "an arbitrary number A to an arbitrary number B" means a range including a number A, numbers greater than the number A and smaller than a number B, and the number B.

Figure 1:
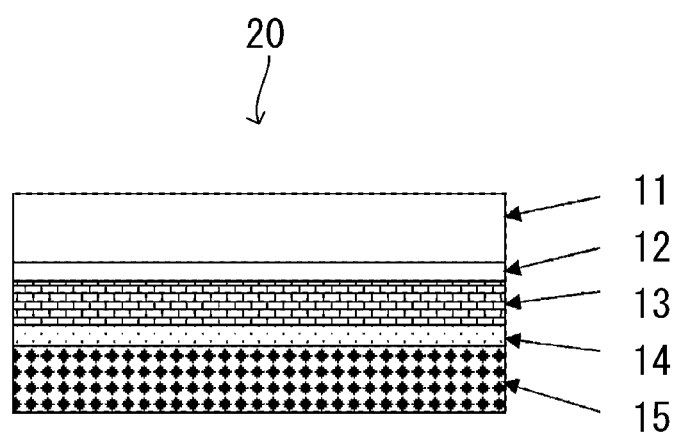
FIG. 1 is a schematic cross section showing an aspect of an electricity storage device packaging material according to the present invention.

As shown in FIG. 1, an electricity storage device packaging material according to the present invention is a laminate formed by successively laminating an outer layer side resin film layer 11, an outer layer side adhesive layer 12, a metal foil layer 13, an inner layer side adhesive layer 14, and a heat seal layer 15. The outer layer side adhesive layer 12 has a role of laminating (i.e., bonding) the outer layer side resin film layer 11 on the metal foil layer 13. The inner layer side adhesive layer 14 has a role of laminating (i.e., bonding) the metal foil layer 13 on the heat seal layer 15.

An electricity storage device container according to the present invention is formed by using an electricity storage device packaging material according to the present invention, and there is no particular restriction on its form. Preferable examples of the electricity storage device container include one having a tray-like shape shown in FIG. 2. In this example, the heat seal layer 15 is disposed on the inner side of the tray, i.e., the concave surface side with which a space for accommodating electrodes, an electrolyte, and so on is formed, and the outer layer side resin film layer 11 is disposed on the outer side of the tray, i.e., the convex surface side. Examples of the shape of the electricity storage device include cylindrical shapes (a cylinder, a rectangular cylinder, an elliptic cylinder, or the like) in addition to the tray-like shape. Such electricity storage device containers are usually obtained by molding them from flat electricity storage device packaging materials. The inner side of the electricity storage device container, i.e., the surface that is brought into contact with an electrolyte solution or the like, is formed by the heat seal layer 15. The heat seal layer 15 in a flange section of an electricity storage device container is fused (i.e., fusion-bonded) with another heat seal layer 15 of another electricity storage device packaging material or with another heat seal layer 15 in a flange section of another electricity storage device container by facing these heat seal layers 15 toward each other, bringing them into contact with each other, and heating them. By doing so, components of the electricity storage device such as an electrolyte solution and electrodes can be hermetically accommodated in the electricity storage device packaging materials. Examples of the electricity storage device container according to the present invention also include a pouch-type container in addition to the tray-type container.

In general, an electricity storage device container is divided into two sections on its metal foil 13, and the section closer to the electrolyte solution is referred to as "inner side" and the section further from the electrolyte solution is referred to as "outer side". Further, a layer located on the inner side is referred to as "inner layer" and a layer located on the outer side is referred to as "outer layer". Therefore, an electricity storage device packaging material that is going to be used for forming an electricity storage device container is also divided into two sections on its metal foil 13, and the section closer to the electrolyte solution is referred to as "inner side" and the section further from the electrolyte solution is referred to as "outer side". Further, a layer located on the inner side is referred to as "inner layer" and a layer located on the outer side is referred to as "outer layer".

An adhesive composition according to the present invention is suitably used for the formation of the inner layer side adhesive layer 14.

An adhesive composition according to the present invention contains: a polyolefin resin (A) including a carboxyl group or an acid anhydride group; and an epoxy compound (B) including at least two epoxy groups and including at least one of an aromatic amino group and a heterocycle including a nitrogen atom as a heteroatom. A polyolefin resin (A) including a carboxyl group or an acid anhydride group is also simply referred to as "polyolefin resin (A)". An epoxy compound (B) including at least two epoxy groups and including at least one of an aromatic amino group and a heterocycle including a nitrogen atom as a heteroatom is also simply referred to as "epoxy compound (B)".

A curing process is performed by reacting the carboxyl group or the acid anhydride group contained in the polyolefin resin (A) with the epoxy group contained in the epoxy compound (B) in a state where the adhesive composition according to the present invention is sandwiched between the metal foil layer 13 and the heat seal layer 15. By doing so, it is possible to form a strong cross-linking structure, obtain a sufficient adhesive strength, and maintain the adhesive strength at a high level even when the laminate is submerged in an electrolyte solution having a higher temperature for a long time.

<Polyolefin Resin (A) Including Carboxyl Group or Acid Anhydride Group>

The polyolefin resin (A) preferably has solubility in a solvent used for the adhesive composition and non-crystallinity so that the polyolefin resin (A) is stably kept without causing any precipitation in the solution into which the polyolefin resin (A) is dissolved (i.e., so that the polyolefin resin (A) has preservation stability). On the other hand, in order to improve the electrolyte-resistance of an adhesive layer in a laminate, the polyolefin resin (A) preferably includes a part having crystallinity. Therefore, the balance between non-crystallinity and crystallinity is important. The polyolefin resin (A) used in the present invention preferably has a weight-average molecular weight of 50,000 to 500,000 and a melting point of 60 to 110° C., and its melting energy (ΔE) is preferably 15 to 50 (mJ/mg).

By adjusting its weight-average molecular weight (Mw) to 50,000 to 500,000, it is easy to make the polyolefin resin (A) included in the adhesive composition have both satisfactory preservation stability as the solution and satisfactory properties as an electricity storage device packaging material including an electrolyte-resistance, a heat seal property, and a coating property. More preferably, the polyolefin resin (A) has an Mw (weight-average molecular weight) of 100,000 to 400,000.

In other words, when the Mw of the polyolefin resin (A) is smaller than 50,000, the entanglement of polymer chains of the polyolefin resin (A) is insufficient, thus causing a possibility that the film strength of the adhesive layer deteriorates and hence the electrolyte-resistance is insufficient. On the other hand, when the Mw of the polyolefin resin (A) is greater than 500,000, the preservation stability at 25° C. as the polyolefin resin (A) solution could decrease and the coating property could deteriorate due to the excessively high viscosity of the adhesive solution.

By adjusting its melting point to 60 to 110° C. and its melting energy ($\Delta E$) to 15 to 50 (mJ/mg), it is possible to make the polyolefin resin (A) have a satisfactory adhesive strength (the initial adhesive strength and the adhesive strength after the immersion of the laminate into the electrolyte solution) and a satisfactory heat seal property as a battery packaging material with an excellent balance between the adhesive strength and the heat seal property.

In other words, when the melting point of the polyolefin resin (A) is lower than 60° C., the adhesive strength and the heat seal property after the immersion of the laminate into the electrolyte solution could deteriorate. When the melting point is higher than 110° C., the adhesive strength (the initial adhesive strength and the adhesive strength after the immersion of the laminate into the electrolyte solution) could deteriorate. More preferably, the melting point of the polyolefin resin (A) is 60 to 90° C.

Further, when the melting energy ($\Delta E$) of the polyolefin resin (A) is lower than 15 (mJ/mg), the adhesive strength and the heat seal property after the immersion of the laminate into the electrolyte solution could deteriorate. Further, when the melting energy ($\Delta E$) is higher than 50 (mJ/mg), the crystallinity increases, possibly causing the deterioration of the preservation stability as the polyolefin resin (A) solution. More preferably, the melting energy ($\Delta E$) of the polyolefin resin (A) is 20 to 50 (mJ/mg), and particularly preferably, the melting energy ($\Delta E$) is 20 to 40 (mJ/mg).

The heat seal property is explained hereinafter.

The electricity storage device packaging material is required to have an excellent heat seal property as well as the two properties (a large adhesive strength and an excellent electrolyte-resistance) described in the "Summary of the Invention" section.

As described previously, the heat seal layer 15 included in the electricity storage device packaging material needs to have the function of hermetically encapsulating components of the electricity storage device such as an electrolyte solution and electrodes in the electricity storage device container by thermally fusing (i.e., fusion-bonding) the heat seal layer 15 included in the electricity storage device packaging material with the heat seal layer 15 included in the counterpart electricity storage device packaging material. It is conceivable that a heat sealing process performed at a high temperature under a high pressure is desirable in order to ensure a large heat seal strength (the peel strength between the heat seal layers 15).

However, if the inner layer side adhesive layer 14 that has bonded the heat seal layer 15 to the metal foil layer 13 is melted or deformed due to the heat and the pressure in the heat sealing process, the metal foil layer 13 could possibly be electrically connected with an electrode terminal. If they are electrically connected to each other, the electricity storage device does not function as an electricity storage device. Therefore, it is necessary that the inner layer side adhesive layer 14 be neither melted nor deformed due to the heat and the pressure in the heat sealing process to prevent the insulation between the electrode terminals and the metal foil layer 13 from being impaired due to the heat sealing process.

The use of a polyolefin resin (A) whose melting point and melting energy ($\Delta E$) are within the aforementioned ranges can reduce/prevent the melting and the deformation of the inner layer side adhesive layer 14 during the heat sealing process.

Note that in the present invention, the expression "having preservation stability" means having a property in which no precipitation occurs when a transparent solution, which is obtained by adding 10 g of a polyolefin resin (A) into 90 g of toluene and heating and melting the resin, is cooled to 25° C. and left undisturbed at 25° C. for one week.

There is no particular restriction on the polyolefin resin (A), provided that they can include a carboxyl group or an acid anhydride group. Examples of the polyolefin resin (A) in the present invention include a modified polyolefin resin obtained by graft-polymerizing an ethylenically unsaturated carboxyl group or its acid anhydride with a polyolefin resin (A1) including no carboxyl group and no acid anhydride group, and a copolymer of an olefin monomer and an ethylenically unsaturated carboxylic acid or its acid anhydride. Further, a polyolefin including a carboxyl group can be obtained by reacting an acid anhydride group of a polyolefin including an acid anhydride group with water or alcohol. Preferably, a modified polyolefin resin obtained by graft-polymerizing an ethylenically unsaturated carboxyl group or its acid anhydride with a polyolefin resin (A1) including no carboxyl group and no acid anhydride group is used. A polyolefin resin (A) may be solely used, or two or more polyolefin resins (A) may be arbitrarily combined with each other and used in combination.

The amount of the carboxyl group or the acid anhydride group contained in the polyolefin resin (A) is described later.

There is no particular restriction on the polyolefin graft-polymerization method. For example, a method disclosed in Japanese Unexamined Patent Application Publication No. H11-293216 can be used. There is no particular restriction on the aforementioned polyolefin resin (A1). Examples of the polyolefin resin (A1) include: homo-polymers of an olefin monomer such as ethylene, propylene, 1-butene, butadiene, isoprene, 1-hexene, and 1-octene; copolymers of olefin monomers or copolymers of an olefin monomer and other monomers; and polymers mainly composed of hydrocarbon skeletons such as hydrides and halides of the obtained polymers. Preferably, a copolymer of olefin monomers is used.

As the copolymer of olefin monomers, a copolymer of 1-butene and another olefin monomer(s) is preferred. As the other olefins, ethylene and propylene are preferred. Examples of the copolymer of 1-butene and another olefin monomer(s) include a binary copolymer of ethylene and 1-butene, a binary copolymer of propylene and 1-butene, and a ternary copolymer of ethylene, propylene, and 1-butene. More preferably, a binary copolymer of propylene and 1-butene is used. The polymerization ratio is preferably adjusted to "propylene:1-butene=10:90 to 80:20", and more preferably "propylene:1-butene=40:60 to 80:20" as expressed in a molar ratio. In the case of the copolymer of propylene and 1-butene, when the amount of propylene is smaller than 10 mole %, the melting point could be lower than 60° C. Further, when the amount of propylene is larger than 80 mole %, the melting point could be higher than 110° C.

There is no particular restriction on the monomers that may be copolymerized with the olefin monomer.

Examples of such monomers include:

aromatic vinyl compounds such as styrene, α-methyl styrene, and indene;

alkyl (meth)acrylate compounds such as methyl (meth) acrylate, ethyl (meth) acrylate, butyl (meth)acrylate, hexyl (meth)acrylate, octyl (meth)acrylate, 2-ethyl hexyl (meth) acrylate, dodecyl (meth)acrylate, stearyl (meth)acrylate, and behenyl (meth)acrylate;

(meth)acrylate compounds including an alicyclic structure such as cyclohexyl (meth)acrylate and isobornyl (meth) acrylate;

(meth)acrylate compounds including an aromatic ring such as benzyl (meth) acrylate;

(meth)acrylate compounds including a hydroxyl group such as 2-hydroxyethyl (meth)acrylate, 2-hydroxypropyl (meth)acrylate, and 4-hydroxybutyl (meth)acrylate;

(meth)acrylate compounds including an amino group such as dimethylaminoethyl (meth)acrylate, diethylaminoethyl (meth)acrylate, and t-butylaminoethyl(meth) acrylate;

acrylic amides such as (meth)acrylic amide, dimethyl (meth)acrylic amide, dimethylaminopropyl (meth)acrylic amide, isopropyl (meth)acrylic amide, diethyl (meth)acrylic amide, and hydroxyethyl (meth)acrylic amide; and (meth)acrylonitrile and acryloyl morpholine.

In view of the graft-polymerization property and the compatibility with the polyolefin, styrene, dodecyl (meth) acrylate, and stearyl (meth)acrylate are preferred.

There is no particular restriction on the aforementioned ethylenically unsaturated carboxylic acid, and examples thereof include acrylic acid, methacrylic acid, maleic acid, fumaric acid, crotonic acid, and itaconic acid. Only one of these ethylenically unsaturated carboxylic acids and their acid anhydrides may be used, or two or more of them may be used together. Note that the term "(meth)acrylate" means both methacrylate and acrylate.

There is no particular restriction on the olefin monomer polymerization method. For example, a method disclosed in Japanese Examined Patent Application Publication No. H07-080948 can be used. For example, a metal catalyst such as a Ziegler-Natta catalyst and a metallocene catalyst may be sued. Further, polymerization may be performed by adding a promoter such as (methyl)aluminoxane as required.

Note that weight-average molecular weights (Mw), melting points, and melting temperature energy (ΔE) of polyolefin resins (A) specified in this specification are values obtained by a method described in the below-shown examples.

As the polyolefin resin (A), commercially available products can also be used. Examples of commercially available products include Sumifitt CK1D (brand name, manufactured by Sumitomo Chemical Co., Ltd.), Unistole P-401, P-802 and P-902 (brand names), Umex 1001, 1010 and 2000 (brand names, manufactured by Sanyo Chemical Industries, Ltd.), and Auroren 350S, 351S, 359S, S-5247S, S-5248S, S-5297S, S-5349S and S-5350S.

In the present invention, a polyolefin resin including no carboxyl group and no acid anhydride group may be used together with the polyolefin resin (A) including a carboxyl group or an acid anhydride group as long as the advantageous effect of the present invention is not impaired. The use of a polyolefin resin including no carboxyl group and no acid anhydride group can improve the moisture barrier property.

Examples of the polyolefin resin including no carboxyl group and no acid anhydride group include: Tafthren T3712, T3722 and T3522 (propylene-based elastomer) manufactured by Sumitomo Chemical Co., Ltd.; Sumitomo Nobrene (polypropylene); Tafmer DF&A, Tafmer H, Tafmer XM, Tafmer BL and Tafmer M (α-olefin copolymer) manufactured by Mitsui Chemicals, Inc.; Kurapren LIR 30 (isoprene copolymer), LIR-200 (hydrogenized isoprene polymer), and LBR-300 (butadiene copolymer) manufactured by Kuraray Co., Ltd.; Septon 2002 and 2004 (hereinbefore, hydrogenized styrene-isoprene-styrene copolymer) and 2104, 4033 and HG252 (hereinbefore, hydrogenized styrene-isoprene/butadiene-styrene copolymer) manufactured by Kuraray Co., Ltd.; Asaprene T-432 and T-437 manufactured by Asahi Kasei Chemicals Corporation; Clayton D1155 (hereinbefore, styrene-butadiene-styrene copolymer) manufactured by Clayton Polymer Japan Co., Ltd.; Taftech P1500, P2000 and MP10 (partially-hydrogenized styrene-butadiene-styrene copolymer), H1052 and H1043 (hereinbefore, hydrogenized styrene-butadiene-styrene copolymer) manufactured by Asahi Kasei Chemicals Corporation; Supercron C (chloride of propylene copolymer) manufactured by Nippon Paper Chemicals Co., Ltd.; Rexpearl EMA (ethylene-methyl acrylate copolymer) and Rexpearl EEA (ethylene-ethyl acrylate copolymer) manufactured by Japan Polyethylene Corporation; Evaflex (ethylene-vinyl acetate copolymer) manufactured by Du Pont-Mitsui Polychemicals Co., Ltd.; and Bondfast (ethylene-glycidyl methacrylate copolymer) manufactured by Sumitomo Chemical Co., Ltd. These resins can be used as they are. Alternatively, they can be used by controlling their fluidities by a reaction disclosed in Japanese Patent No. 4076850 or the like, i.e., a thermal decomposition reaction using radicals generated form a peroxide. Among these resins, polypropylene, an α-olefin copolymer, and their products obtained by a thermal decomposition reaction are preferred in view of the adhesive force and the electrolyte-resistance. The polyolefin resin including no carboxyl group and no acid anhydride group can be added within the range in which the adhesive force and the electrolyte-resistance are not impaired. The amount of the polyolefin resin including no carboxyl group and no acid anhydride group relative to the amount of the polyolefin resin (A) including a carboxyl group or an acid anhydride group is preferably 10 to 80%, more preferably 10 to 50%, and particularly preferably 10 to 30%.

Only one of these resins may be used, or two or more of these resins may be arbitrarily combined with each other and used in combination.

Next, the epoxy compound (B) used in the present invention is explained.

It is possible to achieve a sufficient adhesive strength by a strong cross-linking structure obtained by reacting the epoxy group contained in the epoxy compound (B) with the carboxyl group or the acid anhydride group contained in the polyolefin resin (A) and maintain the adhesive strength at a high level even when the laminate is submerged in an electrolyte solution at a higher temperature for a long time.

The epoxy compound (B) used in the present invention may be, though not limited to, a compound including at least two epoxy groups and including at least one of an aromatic amino group and a heterocycle including a nitrogen atom as a heteroatom. The aromatic amino group is a tertiary amine group and nitrogen in the heterocycle does not include active hydrogen.

Examples of compounds including two epoxy groups among the compounds including an aromatic amino group include N,N-bis(2,3-epoxypropyl) aniline,
2-methyl-N,N-bis(2,3-epoxypropyl) aniline,
N,N-diglycidyl aniline ("GAN" manufactured by Nippon Kayaku Co., Ltd.), and
N,N-diglycidyl-2-methylbenzene amine ("GOT" manufactured by Nippon Kayaku Co., Ltd.).

Examples of compounds including three or more epoxy groups among the compounds including an aromatic amino group include
N,N,N',N'-tetrakis(2,3-epoxypropyl)-1,4-phenylene diamine,
N,N,N',N'-tetrakis(oxirane-2-ylmethyl)-4,4'-methylenebisaniline (another name: tetraglycidyl diaminodiphenyl methane "jER-604" manufactured by Mitsubishi Chemical Corporation), and
N,N-diglycidyl-4-(glycidyloxy) aniline (another name: N,N-bis(2,3-epoxypropyl)-4-(2,3-epoxypropoxy) aniline, "jER-630" manufactured by Mitsubishi Chemical Corporation).

Further, examples of compounds including two or more epoxy groups and an aromatic amino group also include Araldite MY0600 (brand name, manufactured by Huntsman Corporation), Adekaresin EP-3950S, 3950L and 3980S (brand names, manufactured by Adeka Corporation, and YH-434 and YH-434L (brand names, manufactured by Nippon Steel Chemical Co., Ltd.).

For the epoxy compound (B), examples of compounds including at least two epoxy groups and including a heterocycle including a nitrogen atom as a heteroatom include TEPIC-G, TEPIC-S, TEPIC-SP, TEPIC-SS, TEPIC-HP, TEPIC-L, TEPIC-PAS, and TEPIC-VL (brand names, manufactured by Nissan Chemical Industries Ltd.,), and epoxy compounds including a triazine skeleton such as 2,4,6-tri(glycidyloxy)-1,3,5-triazine.

Only one epoxy resin (B) may be used, or two or more epoxy resins (B) may be arbitrarily combined with each other and used in combination.

Further, a compound that is obtained by reacting a part of the epoxy group (i.e., some of epoxy groups) of the aforementioned epoxy compound (B) with a compound that is reactive to an epoxy group may also be used as an epoxy compound (B).

Examples of compounds reactive to an epoxy group include:
compounds containing an amino group such as butylamine, hexylamine, octylamine, 2-ethyl hexylamine, dibutylamine, ethylenediamine, benzylamine, and aniline;
compounds containing a hydroxyl group such as methanol, ethanol, propanol, isopropanol, butanol, hexanol, octanol, 2-ethyl hexyl alcohol, dodecyl alcohol, ethylene glycol, propylene glycol, benzyl alcohol, and phenol;
compounds containing an isocyanate group such as octyl isocyanate, dodecyl isocyanate, hexamethylene diisocyanate, tolylene diisocyanate, and diphenyl methane diisocyanate; and
compounds containing a carboxylic acid such acetic acid, butanoic acid, hexanoic acid, octanoic acid, succinic acid, adipic acid, sebacic acid, and phthalic acid.

As the epoxy compound (B) used in the present invention, compounds including an aromatic amino group are preferred to compounds including a heterocycle including a nitrogen atom as a heteroatom because a better electrolyte-resistance can be achieved. More preferably, a compound including three or more epoxy groups and an aromatic amino group is used.

In the present invention, besides the aforementioned epoxy compounds (B), epoxy compounds (except for the epoxy compounds (B)), oxetane compounds, isocyanate compound, carbodiimide compounds, oxazoline compounds, and so on, which react with the carboxyl group or the acid anhydride group contained in the polyolefin resin (A), can be added.

There is no particular restriction on the epoxy compounds other than the epoxy compounds (B), provided that they include at least one epoxy group, and examples of them include bisphenol-type epoxy resins, novolac-type epoxy resins such as cresol novolac-type epoxy resins and phenol novolac-type epoxy resins, modified epoxy resins thereof, and hydrogenated epoxy resins thereof.

Examples of the epoxy compounds other than the epoxy compounds (B) also include:
bisphenol-type epoxy resins such as EPICLON 830, 840, 860 and 1055 manufactured by DIC Corporation, Adekaresin EP-4100, 4400 and 4901 manufactured by Adeka Corporation, jER-828, 1001, 1003, 1010 and 4004P manufactured by Mitsubishi Chemical Corporation, and Epotohto YD-128 and 170 manufactured by Nippon Steel & Sumikin Chemical Co., Ltd.;
novolac-type epoxy resins such as EPICLON N-660 and N-740 manufactured by DIC Corporation, and YDPN-638 and YDCN-704A manufactured by Nippon Steel & Sumikin Chemical Co., Ltd.; and
modified epoxy resins and hydrogenated epoxy resins such as EPICLON N-865 and TSR-601 manufactured by DIC Corporation, Adekaresin EPR-4030 and EPR-49-23 manufactured by Adeka Corporation, and Epotohto YD-172 and ST-3000 manufactured by Nippon Steel & Sumikin Chemical Co.

Further, as epoxy compounds having other structures, alicyclic epoxy compounds such as Celloxide 2021 manufactured by Daicel Corporation, biphenyl-type epoxy compounds such as YX-4000 manufactured by Mitsubishi Chemical Corporation, and epoxy compounds containing an aliphatic amino group such as TETRAD-X and C manufactured by Mitsubishi Gas Chemical Company, Inc. can be used.

There is no particular restriction on the oxetane compounds, provided that they include an oxetane group, and examples of them include Aron Oxetane OXT-121 and 221, and ETERNACOLL OXMA manufactured by Toagosei Co., Ltd.

There is no particular restriction on the isocyanate compounds, provided that they include an isocyanate group, and examples of them include isophorone diisocyanate, hexamethylene diisocyanate, tolylene diisocyanate, diphenyl methane diisocyanate, those obtained by converting them into polymers and nurates, mixtures thereof, and copolymers of these compounds and other polymers.

There is no particular restriction on the carbodiimide compounds, provided that they include a carbodiimide group, and examples of them include Carbodilite V-01, 03 and 07 manufactured by Nisshinbo Chemical Inc.

There is no particular restriction on the oxazoline compounds, provided that they include an oxazoline skeleton, and examples of them include Epocros RPS manufactured by Nippon Shokubai Co., Ltd.

For the polyolefin resin (A) used in the present invention, a value expressed by an expression "X+2Y" is preferably 0.05 to 0.6 in order to obtain an excellent adhesiveness and an excellent dissolving property, where X milli-moles (mmol) is the amount of carboxyl groups per gram of the polyolefin resin (A) and Y milli-moles (mmol) is the amount of acid anhydride groups per gram of the polyolefin resin (A).

When the value "X+2Y" is smaller than 0.05, the amount of acidic groups, which serve as cross-linking points, is small and hence the cross-linking is insufficient, possibly making it impossible to achieve a sufficient adhesive strength and a sufficient electrolyte-resistance. When the value "X+2Y" is greater than 0.6, the cross-linking shrinkage of the coating increases, possibly making the adhesive strength insufficient and deteriorating the dissolving property to the solvent.

The epoxy compound (B) is contained in the adhesive composition in such an amount that a value expressed by an expression "Z/[(X+2Y)P]" is in a range of 0.3 to 10, and preferably in a range of 0.5 to 0.7, where P grams (g) is the amount of the polyolefin resin (A) contained in the adhesive composition and Z milli-moles (mmol) is the amount of epoxy groups derived from the epoxy compound (B).

When the value "Z/[(X+2Y)P]" is smaller than 0.3, the amount of mixed epoxy groups with respect to the active hydrogen derived from the carboxyl group of the polyolefin resin (A) including a carboxyl group or an acid anhydride group is so small that cross-linking structures are not sufficiently formed, possibly making the cohesive force insufficient and thereby making the adhesive strength and the electrolyte-resistance insufficient. When the value "Z/[(X+2Y)P]" is greater than 10, unreacted epoxy compounds (B) remain excessively in the adhesive composition, possibly deteriorating the electrolyte-resistance.

A silane coupling agent used in the present invention is explained.

An adhesive according to the present invention can further contain a silane coupling agent in order to improve the adhesive strength with a metal foil. Examples of the silane coupling agent include trialkoxy silanes including a vinyl group such as vinyl trimethoxy silane and vinyl triethoxy silane, trialkoxy silanes including an amino group such as 3-aminopropyl triethoxy silane, N-(2-aminoethyl) 3-amino propyl trimethoxy silane, and trialkoxy silanes including a glycidyl group such as 3-glycidoxy propyl trimethoxy silane, 2-(3,4-epoxycyclohexyl) ethyl trimethoxy silane, 3-glycidoxy propyl triethoxy silane. The amount of the silane coupling agent is preferably 0.1 to 5 mass %, and more preferably 0.5 to 3 mass % based on the solid content of the adhesive.

Further, an adhesive according to the present invention can further contain a phosphoric oxygen acid or its derivative in order to improve the adhesive strength after the immersion of the laminate into the electrolyte solution. Of the phosphoric oxygen acids and their derivatives, any phosphoric oxygen acid including at least one free oxygen acid may be used. Examples of the phosphoric oxygen acid include phosphoric acids such as hypophosphorous acid, phosphorous acid, orthophosphoric acid, and hypophosphoric acid, and condensed phosphoric acids such as metaphosphoric acid, pyrophosphoric acid, tripolyphosphoric acid, polyphosphoric acid, and ultraphosphoric acid. Further, examples of the derivative of the phosphoric oxygen acid include those that are obtained by partially converting the above-described phosphoric oxygen acid into an ester with alcohols in a state where at least one free oxygen acid remains. Examples of these alcohols include aliphatic alcohols such as methanol, ethanol, ethylene glycol, and glycerin, and aromatic alcohols such as phenol, xylenol, hydroquinone, catechol, and phloroglucine. Two or more of phosphoric oxygen acids or their derivatives may be combined and used in combination. The amount of the phosphoric oxygen acid or its derivative is preferably 0.01 to 10 mass %, more preferably 0.05 to 5 mass %, and particularly preferably 0.1 to 1 mass % based on the solid content of the adhesive.

An adhesive according to the present invention can further contain an epoxy phosphoric ester resin in order to improve the adhesive strength after the immersion of the laminate into the electrolyte solution. The aforementioned epoxy phosphoric ester resin is one in which an epoxy group of an epoxy resin is ring-opened as the epoxy group reacts with phosphoric acid, and an epoxy resin part is bonded with a phosphoric acid part by a phosphoric acid ester bond.

Preferable epoxy phosphoric ester resins are compounds expressed by the below-shown general formulas (1) and (2).

[Formula 1]

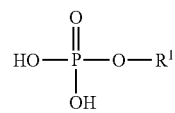

(1)

(In formula, $R^1$ represents epoxy resin residue)

[Formula 2]

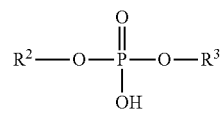

(2)

(In formula, $R^2$ and $R^3$ represent epoxy resin residues)

Examples of the epoxy resin that reacts with phosphoric acid include bisphenol A-type epoxy resins, bisphenol F-type epoxy resins, phenole novolac-type epoxy resins, bisphenol AD-type epoxy resins, biphenyl-type epoxy resins, naphthalene-type epoxy resins, alicyclic epoxy resins, glycidyl ester-type epoxy resins, glycidyl amine-type epoxy resins, heterocyclic epoxy resins, diaryl sulfone-type epoxy resins, hydroquinone-type epoxy resins, and their modified products.

As the epoxy phosphoric ester resin, commercially available products can also be used. Specifically, URAD-DD79 (manufactured by DSM Japan) is preferred. Further, those having characteristic values comparable to those of the aforementioned URAD-DD79 can also be suitably used.

An adhesive according to the present invention can contain catechol or its derivative in order to improve the adhesive strength with a metal foil. Specifically, examples include catechol, t-butyl catechol, adrenalin, noradrenaline, dopamine, and nordihydroguaiaretic acid.

An adhesive composition according to the present invention can contain an organic solvent. There is no particular restriction on the organic solvents, provided that: they can dissolve substances used in the adhesive composition according to the present invention as a sole solvent or a mixed solvent; they are inactive to the epoxy compound (B); and they can be volatilized and removed through heating in a drying step performed in the adhesive composition coating process. Specific examples of those solvents include:

aromatic organic solvents such as toluene and xylene;

aliphatic organic solvents such as n-hexane and n-heptane;

alicyclic organic solvents such as cyclohexane and methyl cyclohexane;

ketone solvents such as methyl ethyl ketone, methyl isobutyl ketone, and cyclohexanone;

ester solvents such as ethyl acetate and butyl acetate;

alcohol solvents such as ethanol, methanol, n-propanol, 2-propanol, butanol, and hexanol; ether solvents such as diisopropyl ether, butyl Cellosolve, tetrahydrofuran, dioxane, and butyl carbitol;

glycol ether solvents such as diethylene glycol monomethyl ether, triethylene glycol monomethyl ether, and propylene glycol monomethyl ether; and glycol ester solvents such as ethylene glycol monomethyl ether acetate, propylene glycol monomethyl ether acetate, and diethylene glycol monoethyl ether acetate.

Only one of these solvents may be used, or two or more of them may be used together.

Among them, combined use of an aromatic organic solvent and a ketone solvent, combined use of an aromatic organic solvent and an alcohol solvent, combined use of an alicyclic organic solvent and a ketone solvent, and combined use of an alicyclic organic solvent and an alcohol solvent are preferred in view of the preservation stability of the polyolefin resin (A).

For the adhesive composition according to the present invention, if necessary, a publicly-known additive such as a tackifier and a plasticizer can be mixed as long as the advantageous effect of the present invention is not impaired. Examples of the tackifier that can be used in the present invention include a polyterpene resin, a rosin resin, an aliphatic petroleum resin, an alicyclic petroleum resin, a copolymer petroleum resin, a styrene resin, and a hydrogenated petroleum resin. They are used to improve the adhesive strength. Only one of these resins may be used, or two or more of these resins may be arbitrarily combined with each other and used in combination.

Further, examples of the plasticizer that can be used in the present invention include liquefied rubbers such as polyisoprene and polybutene, and process oils.

The adhesive composition according to the present invention can be suitably used for laminating a metal foil layer 13 and a heat seal layer 15.

Examples of the metal for the metal foil layer 13 include aluminum, copper, and nickel. These metal foils may be subjected to various surface treatments in advance. Examples of the surface treatments include physical processes such as a sand-blast process and a grinding process, a degreasing process by vapor deposition, an etching process, and a primer process in which a coupling agent or/and a coating agent is applied.

The processing agent for forming a surface treatment layer preferably includes a functional group that reacts with an epoxy group, and more preferably includes at least one functional group selected from a group consisting of a carboxylic acid, a hydroxyl group, and an amino group. Here, the amino group means any of a primary amine, a secondary amine, and an imino group. By providing the above-described surface treatment layer including a functional group on the surface of the metal foil layer 13, the epoxy group contained in the adhesive layer reacts with the aforementioned functional group contained in the surface treatment layer when the adhesive composition is thermally cured. As a result, a laminate having a large initial adhesive strength and an excellent electrolyte-resistance can be obtained.

There is no particular restriction on the heat seal layer 15. However, the heat seal layer 15 is preferably a polyolefin film and preferably an un-drawn film made of at least one type of a thermoplastic resin selected from a group consisting of polyethylene, polypropylene, olefin copolymers, acid-modified substances thereof, and ionomers thereof. There is no particular restriction on the thickness of the heat seal layer. However, the thickness is preferably 20 to 150 µm.

A laminate formed by using an adhesive composition according to the present invention can be obtained by, for example, as shown below.

An uncured adhesive layer is formed by applying an adhesive composition according to the present invention on one of the surfaces of a metal foil layer 13 (or a heat seal layer 15) and evaporating and dissipating (drying) the solvent. Next, after placing a heat seal layer 15 (or a metal foil layer 13) over the surface of the uncured adhesive layer at 60 to 150° C. under pressure, the adhesive layer is sufficiently cured by leaving the stacked layers undisturbed at 40 to 80° C. for three to ten days (this process is also called "aging") and the metal foil layer and the heat seal layer are thereby bonded to each other. As a result, a laminate is obtained.

For the application of the adhesive composition, an ordinary coater such as a comma coater can be used. Further, the thickness (coating amount) of the cured adhesive layer after the drying/curing process is preferably about 0.5 to 10 g/m$^2$.

An electricity storage device packaging material according to the present invention can include an outer layer side resin film layer 11 on the other surface of the metal foil layer 13 (the surface that is not in contact with the inner layer side adhesive layer 14 formed by the adhesive composition according to the present invention) with an outer layer side adhesive layer 12 interposed therebetween.

The outer layer side resin film layer 11 may be laminated on the metal foil layer 13 in advance by using an adhesive composition (the same adhesive composition as the adhesive composition according to the present invention or an adhesive composition different from the adhesive composition according to the present invention). Alternatively, a laminate of the metal foil layer 13 and the heat seal layer 15 can be obtained by using the adhesive composition according to the present invention, and then the outer layer side resin film layer 11 can be laminated on the metal foil layer 13 with the outer layer side adhesive layer 12 interposed therebetween.

Examples of the outer layer side resin film layer 11 to be used include drawn films such as a polyester resin film and a polyamide resin (nylon) film. The outer layer side resin film layer 11 is located on the outer side of the laminate where the outer layer side resin film layer 11 is not in contact with the electrolyte solution when an electricity storage device container is formed by using the laminate as an electricity storage device packaging material.

An electricity storage device container according to the present invention can be obtained by, for example, molding it from the above-described electricity storage device packaging material in such a manner that the outer layer side resin film layer 11 forms a convex surface and the heat seal layer 15 forms a concave surface. Further, without performing the molding process, parts of the heat seal layers located at the ends of battery packaging materials (i.e., electricity storage device packaging materials) may be heat-sealed (i.e., thermally fused together) and hence a pouch-like electricity storage device container may be formed. Further, electricity storage device containers having various shapes may be formed.

Figure 2:
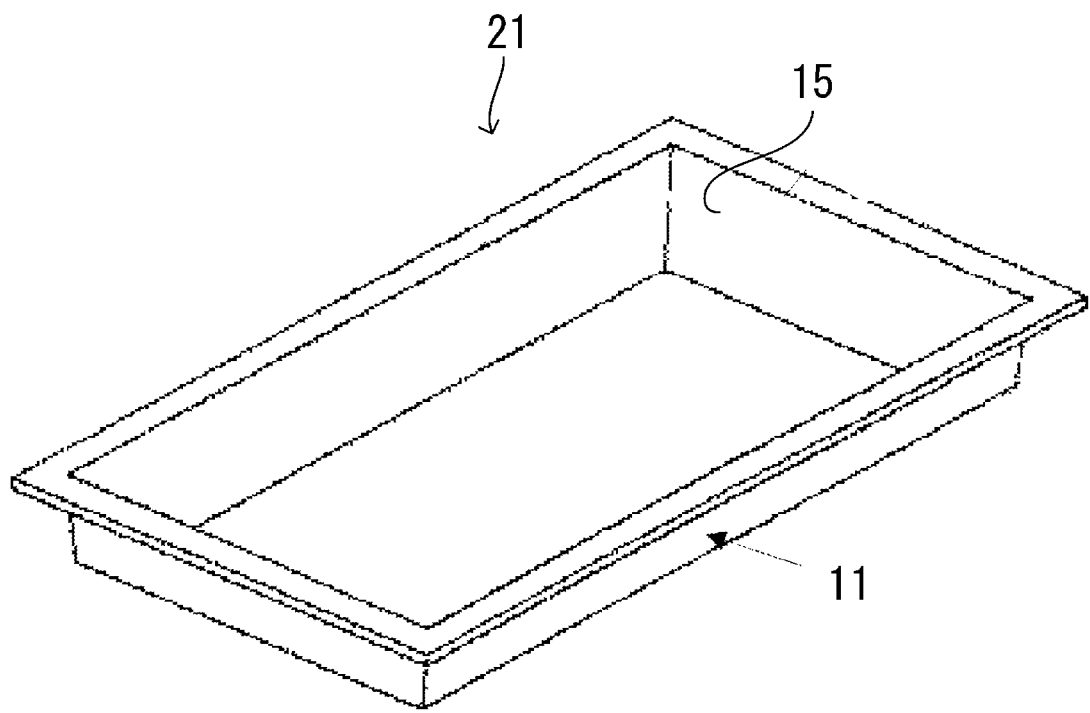
FIG. 2 is a schematic perspective view of an aspect (tray-type) of an electricity storage device container according to the present invention.

Note that in the present invention, the term "concave surface" means a surface with a recess formed therein where an electrolyte solution can be accommodated when a tray-like electricity storage device container shown in FIG. 2 is molded from a flat battery packaging material. Further, the term "convex surface" in the present invention means a surface opposed to the aforementioned surface with the recess formed therein (a rear surface).

Figure 3:
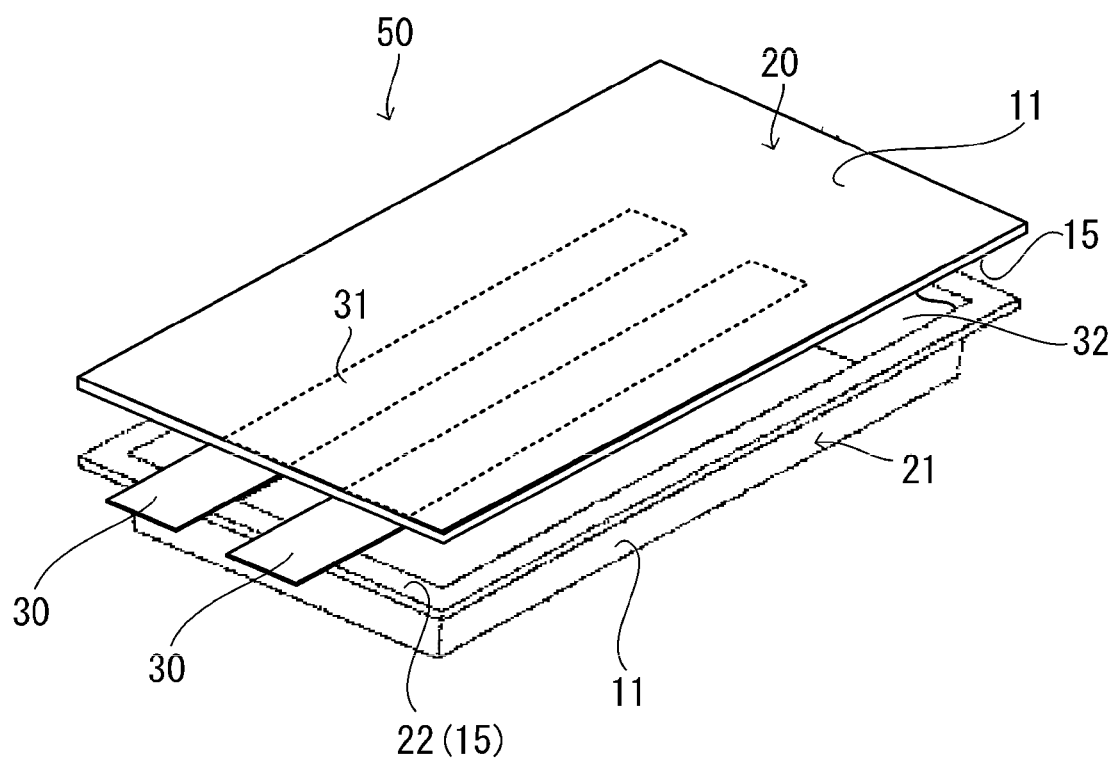
FIG. 3 is a schematic perspective exploded view showing an exemplary embodiment of an electricity storage device according to the present invention.

An electricity storage device such as a secondary battery includes, for example, a battery main body, terminals connected to a positive terminal and a negative terminal, respectively, of the battery main body, a battery container, and an electrolyte solution. The battery container is obtained from a laminate that is formed by laminating a metal foil layer 13 and a heat seal layer 15 with an inner layer side adhesive layer 14 formed from an adhesive composition according to the present invention interposed therebetween. The heat seal layer 15 is brought into contact with an electrolyte solution 32 contained in the electricity storage device container (see FIG. 3). That is, the heat seal layer 15 is positioned on the inner surface side of the electricity storage device container 21. The electricity storage device container 21 of the electricity storage device 50 is used, for example, by placing the end part of the heat seal layer 15 of a sheet-like electricity storage device packaging material 20 over the frame-like top part 22 of an electricity storage device container 21 having a tray-like shape shown in FIG. 2. Note that as shown in a schematic perspective exploded view in FIG. 3, terminals 30 for external connections are sandwiched between the heat seal layers 15 of the electricity storage device container 21 in such a manner that the terminals 30 extend from electrodes 31 accommodated inside the electricity storage device container 21 to the outside of the electricity storage device container 21 in a state where the terminals 30 are sandwiched between the heat seal layers 15. Then, the overlapped parts of the heat seal layers 15 and the parts of the heat seal layers 15 sandwiching the terminals 30 are heat-sealed (i.e., thermally fused together) and hence the electricity storage device container 21 is hermetically sealed. Alternatively, a box-like hermetically-sealed electricity storage device container may be manufactured by using two tray-like electricity storage device containers 21 like the one shown in FIG. 2 instead of using the sheet-like electricity storage device packaging material 20.

The electrolyte solution starts to infiltrate from the heat seal layer 15 toward the metal foil layer 13. However, since the inner layer side adhesive layer 14 formed from the adhesive composition according to the present invention has an excellent tolerance (or resistance) to the electrolyte solution, the adhesive strength between the heat seal layer and the metal foil does not deteriorate, thus preventing problems such as a leakage.

EXAMPLES

The present invention is explained hereinafter in a more specific manner by using examples. However, the scope of the present invention is not limited by the below-shown examples. Note that each evaluation in examples was made in accordance with the later-described evaluation method. Further, the units "%" and "pts." represent "mass %" and "pts.mass", respectively.

<Determination of Quantity of Carboxyl Group>

Firstly a grams (g) of a sample, which was weighed in advance, was dissolved into refluxed xylene. Next, the quantity of the carboxyl group was determined by cooling the xylene with the sample dissolved therein to a room temperature, and performing a titration by using phenolphthalein as an indicator and using 0.1 M of an ethanolic potassium hydroxide. The end of the titration was at the point at which the color of the indicator remains unchanged for 10 seconds. Assuming the titre is b milli-littles (mL), X can be obtained from the following expression.

$$X = 0.1 * b/a$$

Note that the symbol "*" in the expression represents a multiplication. (This is also applied hereinafter.)

<Determination of Quantity of Acid Anhydride Group>

Firstly c grams (g) of a sample, which was weighed in advance, was dissolved into refluxed xylene. Next, after the xylene with the sample dissolved therein was cooled to a room temperature, d milli-moles (mmol) of octylamine was added in the obtained solution in an amount equal to or larger than the equivalent weight of the acid anhydride group of the sample. The quantity of the acid anhydride group was determined by performing a titration for the remaining octylamine by using 0.1 M of an ethanolic perchloric acid. Assuming the titre is e milli-littles (mL), Y can be obtained from the following expression.

$$Y = (0.1 * e - d)/c$$

<Weight-Average Molecular Weight>

By using an HLC-8220GPC system manufactured by Tosoh Corporation in which two TSKgel superHZM-N columns were connected, measurement was carried out under the condition that: tetrahydrofuran was used as an eluant; the column temperature is 40° C.; and the flow rate was 0.35 mL/minute. A sample was adjusted (i.e., prepared) by dissolving 2 mg of a polyolefin resin (A) in 5 mL of tetrahydrofuran. Further, the weight-average molecular weight was calculated in terms of standard polystyrene.

<Melting Point, Melting Temperature Energy ($\Delta E$)>

When the diameter or the length of each side of a piece of a polyolefin resin (A) is not greater than 0.5 mm, the piece of the polyolefin resin (A) is used as it is. Meanwhile, those whose diameter or length of each side is greater than 0.5 mm are cut into a piece having a diameter or a length of each side of 0.5 mm or shorter. Then, the polyolefin resin (A) having a weight of 10 mg put in a vessel.

The polyolefin resin (A) is heated to 200° C. at a rate of 10° C. per minute, and then it is cooled to −60° C. at a rate of 10° C. per minute. Then, the polyolefin resin (A) is heated to 200° C. at a rate of 10° C. per minute, and the melting point is obtained based on the peak top of the peak corresponding to the melting state that appears during this heating process. Further, the melting energy ($\Delta E$) is obtained base on the area of a part extending from a point at which the peak corresponding to the melting state leaves the base line to a point at which the peak returns to the base line.

When two or more types of polyolefin resins (A) were used together, the melting point was obtained from the peak top of the peak on the high temperature side and the melting energy ($\Delta E$) was calculated from the sum total of all the peak areas obtained based on the melting state.

<Copolymerization Composition Ratio>

The copolymerization composition ratios of polyolefins were obtained by measurement of $^{13}C$ by using NMR (JNM-LA400) manufactured by JEOL Ltd.

In particular, 20 mg of a sample was dissolved into 1 mL of heavy chloroform and measurement was carried out. A peak of methylene groups derived from ethylene appeared in a range of 40 to 50 ppm and a peak of methine groups derived from propylene appeared in a range of 25 to 30 ppm. Further, a peak of methine groups derived from 1-butene appeared in a range of 30 to 35 ppm. Copolymerization composition ratios were obtained from integration ratios of respective peaks. Copolymerization composition ratios were obtained from integration ratios of respective peaks.

Synthesis Example 1

Firstly, 250 mL of refined toluene, 0.5 mg of methyl aluminoxane in terms of an Al atom, and 1.25 µg of dimethylsilyl-bis-(4,5,6,7,8-pentahydroazulene-2-yl) zirconium dichloride in terms of a Zr atom were put in a nitrogen-substituted glass autoclave having an internal volume of 500 mL, and the content was heated to 40° C. Next, polymerization was started by continuously supplying a 1-butene monomer while supplying ethylene and propylene at constant rates of 50 L/hr and 40 L/hr, respectively, so that a constant pressure of 1.32 MPa was maintained at 40° C. After the polymerization was continued at 40° C. for eight hours, it was stopped by adding isopropanol. The obtained polymer solution was added to a large amount of methanol and a polymer was thereby precipitated. By filtering out and drying the precipitated polymer, copolymerized polyolefin having a molar ratio of "ethylene/propylene/1-butene=46/33/15" was obtained.

Then, 20 g of the obtained polyolefin and 20 g of Cellosolve acetate were put in a vessel. Further, the mixture was heated and melted under a nitrogen gas stream and the temperature of the obtained solution was adjusted to 110° C. A solution obtained by dissolving 4 g of maleic anhydride, 2 g of lauryl methacrylate, and 0.6 g of benzoyl peroxide into 239.4 of Cellosolve acetate was dropped into the obtained solution over two hours. After the dropping was completed, the reaction was continued for an additional one hour without changing the temperature. The obtained polymer solution was added to a large amount of methanol and a polymer was thereby precipitated. By filtering out and drying the precipitated polymer, a polyolefin resin (A1) including an acid anhydride group was obtained.

The Mw, the melting point, and the ΔE of the polyolefin resin (A1) were 4,700, 103° C., 45 mJ/mg, respectively.

Synthesis Examples 2-4, 6-8

Polyolefin resins (A2)-(A4) and (A6)-(A8) were obtained in a manner similar to that for Synthesis example 1 except that the amounts/values shown in Table 1 were used for the flow rate ratios of the mixed gases and the polymerization temperatures in the olefin polymerization processes and for the amount of the added monomers in the graft-polymerization processes.

Synthesis Example 5

A polyolefin resin was obtained in a manner similar to that for Synthesis example 1 except that the amounts/values shown in Table 1 were used for the flow rate ratio of the mixed gas and the amount of the added monomer in the graft-polymerization process. A polyolefin resin (A5) including a carboxyl group was obtained by preserving the obtained polyolefin resin under an environment of 85° C. and 85% RH for three days.

Synthesis Example 9

Firstly, 280 g of a propylene-ethylene copolymer (propylene/ethylene=82/18 mass %, weight-average molecular weight 85,000) was heated and melted under a nitrogen atmosphere in a four-neck flask. After that, 35.0 g of maleic anhydride and 6.0 g of di-t-butyl peroxide were added as an acidic component and a radical generating agent, respectively, little by little over two hours while stirring the content and maintaining the inside temperature at 180° C. After that, the reaction was continued for one hour. After the completion of the reaction, the obtained reactant was put into a large amount of acetone and the resin was thereby precipitated. After the resin was further washed several times by acetone and unreacted maleic anhydride was thereby removed, the rein was dried under a reduced pressure in a reduced-pressure drier and an acid-modified polypropylene resin (weight-average molecular weight 40,000) was thereby obtained.

By using a stirrer equipped with a one-litter pressure-resistant glass container with a heater, which can be hermitically sealed, 60.0 g of the aforementioned acid-modified polypropylene resin, 60.0 g of tetrahydrofuran, 6.9 g of N,N-dimethyl ethanolamine (1.0 times equivalent weight with respect to the carboxyl group of the acidic component contained in the acid-modified polypropylene resin), and 173.1 g of distilled water were put in the glass container and the content was stirred while rotating the stirring blades at a rotation speed of 300 rpm. As a result, it was observed that the content was in a suspended state without causing any granular resin precipitation at the bottom of the container. Therefore, while maintaining this state, the heater was powered on after 10 minutes had elapsed. Then, after further stirring the content for 60 minutes while maintaining the inside temperature at 140° C., the heater was powered off and the content was naturally cooled to 60° C. While the temperature was kept at 60° C. after the cooling, the content was stirred under a reduced pressure and the solvent was thereby removed. Further, water was added as required and the medium was thereby replaced by water. As a result, a water dispersion of a polyolefin resin (A9) was obtained.

Synthesis Example 10

Synthesis Example 10

Triglycidyl cyanurate, which was an epoxy compound (B-1) containing a cyanuric acid skeleton, was synthesized based on the below-shown reaction formula in accordance with the specification of U.S. Pat. No. 2,741,607.

[Formula 3]

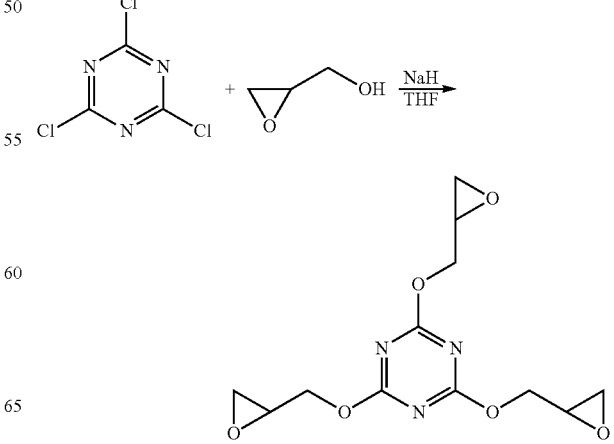

TABLE 1

|  |  | Olefin polymerization | | | Copolymerization ratio of polyolefin before graft-polymerization | | | Graft-polymerization | | |
|---|---|---|---|---|---|---|---|---|---|---|
|  |  | Monomer flow rate (L/hr) | | Polymerization temperature | | | | Maleic | | |
|  |  | Ethylen | Propylene | (° C.) | Ethylen | Propylene | 1-butene | anhydride | LMA | St |
| Synthesis example 1 | A1 | 50 | 40 | 40 | 46 | 33 | 15 | 4 | 2 |  |
| Synthesis example 2 | A2 | 50 | 40 | 20 | 46 | 33 | 15 | 4 | 2 |  |
| Synthesis example 3 | A3 |  | 85 | 20 |  | 60 | 35 | 2 | 2 | 1 |
| Synthesis example 4 | A4 |  | 85 | 20 |  | 60 | 35 | 2 | 2 | 1 |
| Synthesis example 5 | A5 |  | 85 | 20 |  | 60 | 35 | 2 | 3 |  |
| Synthesis example 6 | A6 |  | 90 | 20 |  | 70 | 28 | 1 | 1 |  |
| Synthesis example 7 | A7 |  | 90 | 40 |  | 70 | 28 | 0.5 | 1.5 |  |
| Synthesis example 8 | A8 | 50 |  | 0 | 38 |  | 60 | 2 |  |  |

|  |  | Weight-average molecular weight (×10$^3$) | Melting point (° C.) | ΔE (mJ/mg) | X + 2Y (mmol) |
|---|---|---|---|---|---|
| Synthesis example 1 | A1 | 4.7 | 103 | 45 | 0.82 |
| Synthesis example 2 | A2 | 129 | 103 | 45 | 0.82 |
| Synthesis example 3 | A3 | 172 | 75 | 30 | 0.41 |
| Synthesis example 4 | A4 | 215 | 75 | 30 | 0.41 |
| Synthesis example 5 | A5 | 216 | 78 | 27 | 0.41 |
| Synthesis example 6 | A6 | 183 | 80 | 38 | 0.20 |
| Synthesis example 7 | A7 | 108 | 80 | 38 | 0.10 |
| Synthesis example 8 | A8 | 318 | 62 | 20 | 0.41 |

The symbols in Table 1 are as follows:
LMA: lauryl methacrylate
St: styrene

<Manufacture Example 1 of Processed Aluminum>

Firstly, 3.8 parts of a polycarboxylic acid resin (Acryset, EMN-260E, manufactured by Nippon Shokubai Co., Ltd.), 2 parts of orthophosphoric acid, and 4 parts of chromic fluoride were dissolved into 990 parts of distilled water. Then, by dissolving 0.2 parts of a polymer containing an oxazoline group (Epocros WS-700, manufactured by Nippon Shokubai Co., Ltd.) into the solution, a processing agent 1 having a solid content concentration of 1% was manufactured.

A processed aluminum AL-1 including a carboxyl group derived from the polycarboxylic acid resin in its surface treatment layer was obtained by applying the processing agent 1 on one of the surfaces of an aluminum foil (thickness: 40 μm), which was subjected to a degreasing process in advance, so that its dried coating amount became 50 mg/m², and drying it at 150° C.

<Manufacture Example 2 of Processed Aluminum>

A processing agent 2 having a solid content concentration of 1% was manufactured by dissolving 1 part of an aminated phenol copolymer, 0.5 parts of chromic fluoride, and 2 parts of phosphoric acid into 346.5 parts of distilled water.

A processed aluminum AL-2 including a hydroxyl group derived from the aminated phenol copolymer in its surface treatment layer was obtained by applying the processing agent 2 on one of the surfaces of an aluminum foil (thickness: 40 μm), which was subjected to a degreasing process in advance, so that its dried coating amount became 50 mg/m², and drying it at 150° C.

<Manufacture Example 3 of Processed Aluminum>

A cerium oxide sol (which is the processing agent 3) having a solid content concentration of 10% was obtained by mixing 9.1 parts of a cerium oxide, 0.9 parts of sodium phosphate salt, and 90 parts of distilled water.

A processed aluminum AL-3 including a hydroxyl group derived from the phosphoric acid in its surface treatment layer was obtained by applying the processing agent 3 on one of the surfaces of an aluminum foil (thickness: 40 μm), which was subjected to a degreasing process in advance, so that its dried coating amount became 80 mg/m², and drying it at 200° C.

<Manufacture Example 4 of Processed Aluminum>

A processing agent 4 having a solid content concentration of 5% was manufactured by mixing 4.5 parts of polyethylene-imine, 0.5 parts of an acryl-isopropenyl oxazoline copolymer, and 95 parts of distilled water.

A processed aluminum AL-4 including an amino group derived from the polyethylene-imine was obtained by applying the processing agent 4 on the surface of the surface treatment layer of the processed aluminum AL-3 so that its dried coating amount became 25 mg/m², and drying it at 200° C.

<Manufacture Example 5 of Processed Aluminum>

A processing agent 5 having a solid content concentration of 5% was manufactured by dissolving 5 parts of copolymer of "methyl methacrylate/diethylaminoethyl methacrylate=80/20" into 95 parts of ethanol.

A processed aluminum AL-5 including a functional group that reacts with an epoxy group in its surface treatment layer was obtained by applying the processing agent 5 on one of the surfaces of an aluminum foil (thickness: 40 μm), which was subjected to a degreasing process in advance, so that its dried coating amount became 80 mg/m², and drying it at 200° C.

<Manufacture Example 1 of Additive>

Firstly, 545.5 parts of jER 1001 (BPA-type epoxy resin manufactured by Mitsubishi Chemical Corporation, epoxy equivalent weight 475) and 259.0 parts of diethylene glycol dimethyl ether were put in a reaction container equipped with a stirrer, a thermometer, a reflux condenser, and a nitrogen gas feeding tube, and the content was heated to 80° C. while melting the content. After the content was melted, 59.7 parts of acrylic acid was put in the melted content at 80° C. Then, 0.6 parts of dibutylhydroxytoluene and 2.4 parts of triphenylphosphine were put into the melted content. Further, the content was stirred while gradually raising the temperature to 110° C. over one hour. The content was kept at 110° C. for three hours to continue the reaction. When the acid value became equal to or lower than 1.0 mgKOH/g, the temperature was lowered to 80° C. Then, a mixture of 12.1 parts of 85% phosphoric acid and 70.2 parts of diethylene glycol dimethyl ether was continuously dropped over one hour. After the dropping was finished, the reaction was continued at 80° C. for four hours and then 50.5 parts of diethylene glycol dimethyl ether was put in the mixture. As a result, a solution of a phosphoric-acid-modified epoxy resin (C1) having 64.0% of a nonvolatile component and an acid value of 9.0 was obtained.

Example 1

Firstly, 15 parts of the polyolefin rein (A1) were heated and dissolved into 130.3 parts of a solvent having a weight ratio of "toluene/MEK=7/3". By adding 8 parts of GAN (manufactured by Nippon Kayaku Co., Ltd., N,N-diglycidyl aniline having an epoxy equivalent weight of 125) and stirring the mixture, an adhesive solution having a solid content of 15% was obtained.

The adhesive solution was applied on the processed surface of the processed aluminum AL-1 by using a bar coater and the coating was dried at 100° C. for one minute. As a result, an adhesive layer having a dried coating amount of about 2 g/m² was obtained. Next, an un-drawn polypropylene film (hereinafter called "CPP") having a thickness of 40 μm was placed over the adhesive layer. Then, the stacked layers were made to pass through a gap between two rollers having a temperature of 80° C. and a laminate was thereby obtained. After that, the obtained laminate was subjected to a curing process (i.e., aging process) at 40° C. over five days. Hereinafter, the aluminum foil/CPP laminated film obtained in this manner is called "Al/CPP laminated film".

The initial adhesive strength, the solvent-resistance, and the electrolyte-resistance were evaluated by a later-described method. Table 2 shows results of the evaluation.

<Examples 2-4>, <Comparative Example 1>

Adhesive solutions and Al/CPP laminated films were obtained in a manner similar to that for Example 1 by using compositions shown in Tables 2 and 4, and they were evaluated in a manner similar to that for Example 1. Note that the dried coating amount of Example 3 was adjusted to about 1 g/m².

<Examples 5-7, 20>, <Comparative Examples 2-4>

Adhesive solutions were obtained in a manner similar to that for Example 1 by using compositions shown in Tables 2 to 4. Further, Al/CPP laminated films were obtained in a manner similar to that for Example 1 except that the processed aluminum AL-2 was used, and they were evaluated in a manner similar to that for Example 1.

<Examples 8-12, 21, 22>, <Comparative Example 5>

Adhesive solutions were obtained in a manner similar to that for Example 1 by using compositions shown in Tables 2 to 4. Further, Al/CPP laminated films were obtained in a manner similar to that for Example 1 except that the processed aluminum AL-3 was used, and they were evaluated in a manner similar to that for Example 1.

<Examples 13-16>, <Comparative Example 6>

Adhesive solutions were obtained in a manner similar to that for Example 1 by using compositions shown in Tables 2 to 4. Further, Al/CPP laminated films were obtained in a manner similar to that for Example 1 except that the processed aluminum AL-4 was used, and they were evaluated in a manner similar to that for Example 1.

Examples 17-19, 23-25

Adhesive solutions were obtained in a manner similar to that for Example 1 by using compositions shown in Tables 3 and 4. Further, Al/CPP laminated films were obtained in a manner similar to that for Example 1 except that the processed aluminum AL-5 was used, and they were evaluated in a manner similar to that for Example 1.

TABLE 2

|          |    | Polyolefin resin (A) or the like (mass %) | Epoxy resin (B) or the like (mass %) | additive (mass %) | Solvent (mass %) | Z/(X + 2Y)P |
|----------|----|------------------------------------------|--------------------------------------|-------------------|------------------|-------------|
| Examples | 1  | A1 15                                     | GAN 8                                |                   | Mixed solvent 1 130.3 | 6.3     |
|          | 2  | A7 15                                     | 630/604 1/1                          |                   | Mixed solvent 2 96.3  | 13.7    |
|          | 3  | A7 15                                     | 630/604 1/1                          |                   | Mixed solvent 2 102.0 | 13.7    |
|          | 4  | A8 15                                     | 630/604 1/1                          |                   | Mixed solvent 2 121.7 | 3.3     |
|          | 5  | A2 15                                     | GAN 8                                |                   | Mixed solvent 1 130.3 | 6.3     |
|          | 6  | A2 15                                     | GAN 8                                |                   | Mixed solvent 1 130.3 | 6.3     |
|          | 7  | A3 15                                     | 604 0.4                              |                   | Mixed solvent 2 87.3  | 0.6     |
|          | 8  | A3/A6 5/10                                | 604 0.4                              |                   | Mixed solvent 1 87.3  | 0.6     |
|          | 9  | A4 15                                     | GAN 2                                |                   | Mixed solvent 2 96.3  | 3.5     |
|          | 10 | A4 15                                     | 604 2                                |                   | Mixed solvent 2 96.3  | 3.5     |
|          | 11 | A4 15                                     | 630 2                                |                   | Mixed solvent 3 96.3  | 3.5     |

TABLE 2-continued

| | | | | | |
|---|---|---|---|---|---|
| 12 | A4 | 630 | | Mixed solvent 3 | 0.4 |
| | 15 | 0.2 | | 86.1 | |
| 13 | A4 | 630 | | Mixed solvent 2 | 6.8 |
| | 15 | 4 | | 107.7 | |
| 14 | A4 | 630 | | Mixed solvent 2 | 15.8 |
| | 15 | 4.5 | | 107.7 | |
| 15 | A4 | 3950S | | Mixed solvent 2 | 3.5 |
| | 15 | 2 | | 96.3 | |

| | | Application amount (g/m²) | Surface treatment layer | Initial adhesive strength | Solvent-resistance After 2 weeks | Solvent-resistance After 4 weeks | Electrolyte-resistance After 2 weeks | Electrolyte-resistance After 4 weeks |
|---|---|---|---|---|---|---|---|---|
| Examples | 1 | 2.0 | AL1 | B | A | B | B | B |
| | 2 | 2.0 | AL1 | A | A | B | A | B |
| | 3 | 1.0 | AL1 | A | A | B | A | B |
| | 4 | 2.0 | AL1 | A | A | A | A | B |
| | 5 | 2.0 | AL2 | B | A | B | A | B |
| | 6 | 2.0 | AL2 | B | A | B | B | B |
| | 7 | 2.0 | AL2 | A | A | A | A | A |
| | 8 | 2.0 | AL2 | A | A | A | A | A |
| | 9 | 2.0 | AL3 | A | A | A | A | B |
| | 10 | 2.0 | AL3 | A | A | A | A | A |
| | 11 | 2.0 | AL3 | A | A | A | A | A |
| | 12 | 2.0 | AL3 | A | A | A | A | B |
| | 13 | 2.0 | AL3 | A | A | A | A | A |
| | 14 | 2.0 | AL5 | A | A | B | B | B |
| | 15 | 2.0 | AL4 | A | A | A | A | A |

The symbols in Tables 2 to 4 are as follows:

P-401: "Unistole P-401", manufactured by Mitsui Chemicals, Inc., an acid-modified polyolefin resin, solid content acid value 55 mgKOH/g, heating residual 8%;

P-902: "Unistole P-902", manufactured by Mitsui Chemicals, Inc., an acid-modified polyolefin resin, solid content acid value 55 mgKOH/g, heating residual 22%;

5070: "Tafmer XM5070", manufactured by Mitsui Chemicals, Inc., a random copolymer of propylene and 1-butene;

GAN: manufactured by Nippon Kayaku Co., Ltd., N,N-diglycidyl aniline;

604: "jER 604" manufactured by Mitsubishi Chemical Corporation, N,N,N',N'-tetrakis(2,3-epoxypropyl)-1,4-phenylene diamine;

630: "jER 630" manufactured by Mitsubishi Chemical Corporation, N,N-bis(2,3-epoxypropyl)-4-(2,3-epoxypropoxy)aniline;

3950S: "EP-3950S" manufactured by Adeka Corporation, glycidyl amine epoxy resin having epoxy equivalent weight of 95 g/eq;

B-2: substance obtained by diluting Adekaresin EM-0517 (manufactured by Adeka Corporation, bisphenol A diglycidyl ether-type epoxy resin) by water to a solid content concentration 10%;

B-3: substance obtained by diluting Basonat HW-100 (non-block type polyfunctional isocyanate compound, isocyanate content about 17%) by water to a solid content concentration 10%;

860: "EPICLON 860", manufactured by DIC Corporation, bisphenol A-type epoxy resin having epoxy equivalent weight 245 g/eq;

TETRAD-C: manufactured by Mitsubishi Gas Chemical Company, Inc., 1,3-bis(N,N-diglycidyl amino methyl) cyclohexane;

YD: "YD-172", manufactured by manufactured by Nippon Steel & Sumikin Chemical Co., dimer-acid-modified epoxy resin, epoxy equivalent weight 650;

TEPIC: "TEPIC-PAS", manufactured by Nissan Chemical Industries Ltd., epoxy compound containing an isocyanurate skeleton;

TG-G: "TG-G", manufactured by Shikoku Chemicals Corporation, glycoluril derivative containing an epoxy group;

KBM-303: manufactured by Shin-Etsu Chemical Co., Ltd., 2-(3,4-epoxycyclohexyl) ethyl trimethoxy silane;

TPP: triphenylphosphine DD79: "URAD-DD79", manufactured by DSM Corporation, epoxy phosphate ester;

MEK: methyl ethyl ketone;

MCH: methylcyclohexane;

IPA: isopropanol;

Mixed solvent 1: toluene/MEK=7/3 (mass ratio);

Mixed solvent 2: toluene/IPA=8/2 (mass ratio); and

Mixed solvent 3: MCH/IPA=8/2 (mass ratio).

TABLE 3

| | | Polyolefin resin (A) or the like (mass %) | Epoxy resin (B) or the like (mass %) | additive (mass %) | Solvent (mass %) | Z/(X + 2Y)P |
|---|---|---|---|---|---|---|
| Examples | 16 | A4 | 3950S | Orthophosphoric acid | Mixed solvent 2 | 3.5 |
| | | 15 | 2 | 0.1 | 96.3 | |
| | 17 | A4 | 3950S | KBM-303 | Mixed solvent 3 | 3.5 |
| | | 15 | 2 | 0.2 | 96.3 | |
| | 18 | A4 | 3950S | DD79 | Mixed solvent 3 | 3.5 |
| | | 15 | 2 | 0.3 | 96.3 | |

TABLE 3-continued

| | | | | | |
|---|---|---|---|---|---|
| 19 | A6 15 | 3950S 4 | | Mixed solvent 2 107.7 | 14.0 |
| 20 | A3/5070 13/2 | 604 0.4 | | Mixed solvent 1 87.3 | 0.6 |
| 21 | A4 15 | 630/860 3/1 | | Mixed solvent 2 107.7 | 6.8 |
| 22 | A4 15 | 630/YD 3/1 | | Mixed solvent 2 107.7 | 6.8 |
| 23 | A6 15 | TEPIC 4 | | Mixed solvent 2 107.7 | 14.0 |
| 24 | A6 15 | B-1 4 | | Mixed solvent 2 107.7 | 14.0 |
| 25 | A6 15 | TG-G 4 | | Mixed solvent 2 107.7 | 14.0 |

| | | Application amount (g/m²) | Surface treatment layer | Initial adhesive strength | Solvent-resistance After 2 weeks | Solvent-resistance After 4 weeks | Electrolyte-resistance After 2 weeks | Electrolyte-resistance After 4 weeks |
|---|---|---|---|---|---|---|---|---|
| Examples | 16 | 2.0 | AL4 | A | A | A | A | A |
| | 17 | 2.0 | AL4 | A | A | A | A | A |
| | 18 | 2.0 | AL4 | A | A | A | A | A |
| | 19 | 2.0 | AL5 | A | A | B | B | B |
| | 20 | 2.0 | AL2 | A | A | A | A | B |
| | 21 | 2.0 | AL3 | A | A | A | A | A |
| | 22 | 2.0 | AL3 | A | A | A | A | A |
| | 23 | 2.0 | AL5 | A | A | B | B | B |
| | 24 | 2.0 | AL5 | A | A | A | A | A |
| | 25 | 2.0 | AL5 | A | A | B | A | B |

TABLE 4

| | | Polyolefin resin (A) or the like (mass %) | Epoxy resin (B) or the like (mass %) | additive (mass %) | Solvent (mass %) | Z/(X + 2Y)P |
|---|---|---|---|---|---|---|
| Comparative example | 1 | A9 75 | B-2 1.5 | | Water 24.5 | 0.01 |
| | 2 | A9 75 | B-2/B-3 1.5/4.5 | | Water 24.5 | 0.01 |
| | 3 | P-401 100 | 860 4.5 | C-1 2.5 | — | 1.0 |
| | 4 | P-902 100 | 860 2.5 | C-1/TPP 8/0.8 | — | 1.3 |
| | 5 | A1 15 | 860 4 | | Mixed solvent 2 107.7 | 10.8 |
| | 6 | A4 15 | TETRAD-C 4 | | Mixed solvent 3 107.7 | 7.1 |

| | | Application amount (g/m²) | Surface treatment layer | Initial adhesive strength | Solvent-resistance After 2 weeks | Solvent-resistance After 4 weeks | Electrolyte-resistance After 2 weeks | Electrolyte-resistance After 4 weeks |
|---|---|---|---|---|---|---|---|---|
| Comparative example | 1 | 2.0 | AL1 | C | B | C | C | C |
| | 2 | 2.0 | AL2 | C | C | C | C | C |
| | 3 | 2.0 | AL2 | B | A | B | C | C |
| | 4 | 2.0 | AL2 | B | A | B | C | C |
| | 5 | 2.0 | AL3 | C | B | C | C | C |
| | 6 | 2.0 | AL4 | C | B | C | B | C |

[Initial Adhesive Strength]

After leaving Al/CPP laminated films undisturbed for six hours under an environment of a temperature 25° C. and a humidity 65%, each of them was cut into pieces of "200 mm×15 mm". Then, T-type peel tests were carried out by using a tensile tester in conformance with ASTM-D1876-61 under the condition of a temperature 25° C., a humidity 65%, and a load speed 100 mm/minute. For a 15 mm-width peel strength (N) between an aluminum foil and a CPP, an average value of five test pieces was used. The evaluations were made based on the following criterion:

A: 10N or higher;
B: no lower than 5N and lower than 10N; and
C: lower than 5N.

[Solvent-Resistance, Electrolyte-Resistance (Change in Adhesive Strength)]

Test pieces that were produced by a method similar to that for the test pieces used for the initial adhesive strength test were submerged in the below-shown organic solvent or the electrolyte solution for two or four weeks. After that, the test pieces were taken out from the solution or the electrolyte and washed by flowing water for about 10 minutes. After the moisture was sufficiently removed by using paper wipers, the adhesive strengths of the test pieces were measured in a manner similar to that for the adhesive strength measurement before the immersion test. The evaluations were made based on the following criterion:

A: The rate of change to the initial adhesive strength is smaller than ±10%;

B: The rate of change to the initial adhesive strength is smaller than ±30%; and C: The rate of change to the initial adhesive strength is not smaller than ±30%.

Organic solvent: Ethylene carbonate at 40° C.

Electrolyte solution: A solution that is obtained by dissolving lithium hexafluorophosphate into a solvent having a volume ratio "ethylene carbonate/diethyl carbonate/dimethyl carbonate=1/1/1" so that its concentration became 1.5 mol/L was used.

The temperature was adjusted to 85° C.

As shown as Examples 1 to 19 in Table 2, it is possible to provide adhesives having an excellent initial adhesive strength and an excellent adhesive strength after the immersion in an organic solvent or an electrolyte solution.

Each of the adhesives in Comparative examples 1 and 5 contained a bisphenol A-type epoxy resin, and their reactivity was poorer than that of the epoxy compound (B) according to the present invention. Therefore, the adhesive strengths significantly deteriorated after they were submerged in an organic solvent or an electrolyte solution.

The adhesive in Comparative example 2 used an isocyanate compound having a low solvent-resistance as a curing agent in addition to the use of the bisphenol A-type epoxy resin. Therefore, its solvent-resistance was lower than that of Comparative example 1.

Since each of the adhesives in Comparative examples 3 and 4 used a phosphoric-acid epoxy compound, their solvent-resistances were better than that of Comparative example 5. However, their electrolyte-resistances were insufficient.

Although the adhesive in Comparative example 6 used an epoxy compound including an amino group, its reactivity was lower than that of the epoxy compound (B) according to the present invention. Therefore, its electrolyte-resistance was insufficient.

Further, a bag-like pouch was created by using two rectangular laminates of each example. In particular, three sides of the laminates were thermally sealed in such a manner that the CPP forms the inner surface of the pouch. As pseudo-electrode terminals, two aluminum pieces were inserted into the pouch from its opened end in such a manner that the aluminum pieces were not in contact with each other. The aluminum pieces were disposed so that other end of each aluminum piece protruded to the outside of the pouch from its opened end. Even when the opened end was thermally sealed at a high temperature (150 to 200° C.) under a high pressure (0.5 to 3.0 kg/cm$^2$) in the state where these aluminum pieces were sandwiched between the laminates, the adhesive layers were neither melted nor significantly deformed.

However, in the case of Comparative example 2 in which an isocyanate compound was also used as a curing agent, the adhesive was melted and flowed out from the edge. As a result, there were cases where the aluminum came into contact with the pseudo-electrode terminals and hence the insulation could not be ensured.

[Supplementary notes] The disclosure of the present application includes the following invention of technical ideas which are understood from the above-described exemplary embodiments.

(Supplementary note 1): A laminate comprising a metal foil layer and a heat seal layer, wherein the metal foil layer is bonded to the heat seal layer with an adhesive layer interposed therebetween, and the adhesive layer is a layer obtained by performing a curing process for an adhesive compound comprising: a polyolefin resin (A) including a carboxyl group or an acid anhydride group; and an epoxy compound (B) including at least two epoxy groups and including at least one of an aromatic amino group and a heterocycle including a nitrogen atom as a heteroatom.

(Supplementary note 2): The laminate described in Supplementary note 1, further comprising a surface treatment layer between the metal foil layer and the inner layer side adhesive layer, wherein the surface treatment layer is obtained by performing a curing process for a processing agent including a functional group that reacts with the epoxy group.

(Supplementary note 3): The laminate described in Supplementary note 2, wherein the functional group included in the processing agent, which reacts with the epoxy group, is at least one type selected from a group consisting of a carboxyl group, a hydroxyl group, and an amino group.

(Supplementary note 4): An adhesive composition for laminating a metal foil layer and a heat seal layer with an adhesive layer interposed therebetween, the adhesive composition comprising: a polyolefin resin (A) including a carboxyl group or an acid anhydride group; and an epoxy compound (B) including at least two epoxy groups and including at least one of an aromatic amino group and a heterocycle including a nitrogen atom as a heteroatom.

An adhesive composition according to the present invention can be suitably used for packaging materials (laminates) for forming containers for electricity storage devices such as lithium-ion batteries, electric double layer capacitors, and lithium-ion capacitors. Further, an adhesive composition according to the present invention can be suitably used for, in addition to the packaging materials for forming containers, formations of laminates in various industrial fields in which high adhesive strengths and resistances to chemical agents are required, such as fields of constructions, chemicals, medical cares, and automobiles.

What is claimed is:

1. An electricity storage device comprising, at least, an electrolyte, an electrode, and an electricity storage device container, wherein: the electricity storage device container comprises an electricity storage device packaging material, in the electricity storage device packaging material, from an outer layer thereof, at least an outer layer side resin film layer, an outer layer side adhesive layer, a metal foil layer, an inner layer side adhesive layer, and a heat seal layer being stacked; the heat seal layer is positioned in an inner surface of the electricity storage device container; parts of the heat seal layers of the electricity storage device packaging material are placed on each other and heat-sealed so that the electrolyte is hermetically encapsulated in the electricity storage device container; a terminal for an external connection extends from the electrode accommodated inside the electricity storage device container to the outside of the electricity storage device container, the terminal being sandwiched between the heat seal layers of the electricity storage device container, and wherein the inner layer side adhesive layer is a layer for bonding the metal foil layer with the heat seal layer, and is a layer obtained by performing a curing process for an adhesive compound comprising: a polyolefin resin (A) including a carboxyl group or an acid anhydride group; and an epoxy compound (B) including at least two epoxy groups and including at least one of an aromatic amino group and a heterocycle including a nitrogen atom as a heteroatom.

2. The electricity storage device according to claim 1, wherein a weight-average molecular weight of the polyolefin resin (A) is 50,000 to 500,000.

3. The electricity storage device according to claim 1, wherein the polyolefin resin (A) is obtained by acidly-modifying a copolymer obtained from 1-butene and another olefin.

4. The electricity storage device according to claim 1, wherein a value expressed by an expression X+2Y is 0.05 to 0.6, where X milli-moles (mmol) is an amount of the carboxyl group per gram (g) of the polyolefin resin (A) and Y milli-moles (mmol) is an amount of the acid anhydride group per gram of the polyolefin resin (A).

5. The electricity storage device according to claim 4, wherein a value expressed by an expression Z/[(X+2Y)P] is 0.3 to 10, where P grams (g) is an amount of the polyolefin resin (A) and Z milli-moles (mmol) is an amount of the epoxy group derived from the epoxy compound (B).

6. The electricity storage device according to claim 1, further comprising a surface treatment layer between the metal foil layer and the inner layer adhesive layer, wherein the surface treatment layer is a layer obtained by performing a curing process for a processing agent including a functional group that reacts with the epoxy group.

7. The electricity storage device according to claim 6, wherein the functional group included in the processing agent, which reacts with the epoxy group, is at least one type selected from a group consisting of a carboxyl group, a hydroxyl group, and an amino group.

8. An electricity storage device container accommodating, at least, an electrode and an electrolyte of an electricity storage device, and comprising an electricity storage device packaging material, in the electricity storage device packaging material, from an outer layer thereof, at least an outer layer side resin film layer, an outer layer side adhesive layer, a metal foil layer, an inner layer side adhesive layer, and a heat seal layer being stacked,
wherein the heat seal layer is positioned in an inner surface of the electricity storage device container,
wherein the electricity storage device packaging material is configured so that a sealed space is formed by placing a part of the heat seal layer over another part of the same heat seal layer or over a part of the heat seal layer of another electricity storage device packaging material and thermally fusing these parts together, and
wherein the inner layer side adhesive layer is a layer for bonding the metal foil layer with the heat seal layer, and is a layer obtained by performing a curing process for an adhesive compound comprising: a polyolefin resin (A) including a carboxyl group or an acid anhydride group; and an epoxy compound (B) including at least two epoxy groups and including at least one of an aromatic amino group and a heterocycle including a nitrogen atom as a heteroatom.

9. The electricity storage device container according to claim 8, further comprising a surface treatment layer between the metal foil layer and the inner layer adhesive layer, wherein the surface treatment layer is a layer obtained by performing a curing process for a processing agent including a functional group that reacts with the epoxy group.

10. The electricity storage device container according to claim 9, wherein the functional group included in the processing agent, which reacts with the epoxy group, is at least one type selected from a group consisting of a carboxyl group, a hydroxyl group, and an amino group.

11. An electricity storage device packaging material used for an electricity storage device container that accommodates, at least, an electrode and an electrolyte of an electricity storage device, the electricity storage device packaging material comprising, from an outer layer thereof, at least an outer layer side resin film layer, an outer layer side adhesive layer, a metal foil layer, an inner layer side adhesive layer, and a heat seal layer,
wherein a sealed space is formed by placing a part of the heat seal layer over another part of the same heat seal layer or over a part of the heat seal layer of another electricity storage device packaging material and thermally fusing these parts together, and
wherein the inner layer side adhesive layer is a layer for bonding the metal foil layer with the heat seal layer, and is a layer obtained by performing a curing process for an adhesive compound comprising: a polyolefin resin (A) including a carboxyl group or an acid anhydride group; and an epoxy compound (B) including at least two epoxy groups and including at least one of an aromatic amino group and a heterocycle including a nitrogen atom as a heteroatom.

12. The electricity storage device packaging material according to claim 11, further comprising a surface treatment layer between the metal foil layer and the inner layer adhesive layer, wherein the surface treatment layer is a layer obtained by performing a curing process for a processing agent including a functional group that reacts with the epoxy group.

13. The electricity storage device packaging material according to claim 12, wherein the functional group included in the processing agent, which reacts with the epoxy group, is at least one type selected from a group consisting of a carboxyl group, a hydroxyl group, and an amino group.

* * * * *